US008575799B2

(12) United States Patent
Fukui et al.

(10) Patent No.: US 8,575,799 B2
(45) Date of Patent: Nov. 5, 2013

(54) OUTER ROTOR ELECTRIC MOTOR

(75) Inventors: Kentaro Fukui, Wako (JP); Kenichi Shiraki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/283,586

(22) Filed: Oct. 28, 2011

(65) Prior Publication Data

US 2012/0104902 A1 May 3, 2012

(30) Foreign Application Priority Data

Nov. 1, 2010 (JP) ................................ 2010-245627

(51) Int. Cl.
*H02K 11/00* (2006.01)
(52) U.S. Cl.
USPC .................. 310/68 B; 310/67 R; 310/68 R
(58) Field of Classification Search
USPC ...................... 310/68 R, 67 R, 68 B
See application file for complete search history.

(56) References Cited

U.S. PATENT DOCUMENTS

| 7,138,742 B2* | 11/2006 | Arimitsu et al. ........ 310/216.057 |
| 2004/0174162 A1* | 9/2004 | Kuwahara ................ 324/207.25 |
| 2006/0232147 A1* | 10/2006 | Cheng .......................... 310/52 |

FOREIGN PATENT DOCUMENTS

| JP | 3052573 | 11/1993 |
| JP | 2006-158014 | 6/2006 |
| JP | 2008-253124 | 10/2008 |

OTHER PUBLICATIONS

Japanese Office Action for corresponding JP Application No. 2010-245627, Nov. 16, 2012.

* cited by examiner

*Primary Examiner* — Tran Nguyen
*Assistant Examiner* — Naishadh Desai
(74) *Attorney, Agent, or Firm* — Ditthavong Mori & Steiner, P.C.

(57) ABSTRACT

An outer rotor electric motor includes a stator, an annular rotor and a resolver. The stator includes a stator core and a plurality of coils. The stator core has a plurality of teeth that are spaced at a specified interval in a circumferential direction. The plurality of teeth protrude radially. Each of the plurality of coils is formed by winding a wire around an outer circumference of each of the plurality of teeth. The annular rotor is disposed radially outward with respect to the stator. The resolver is disposed radially inward with respect to the stator core and includes a resolver stator and a resolver rotor. The resolver stator is mounted on the stator or a case member. The resolver rotor is mounted on the annular rotor or a support member that supports the annular rotor such that the resolver rotor opposes the resolver stator.

5 Claims, 10 Drawing Sheets

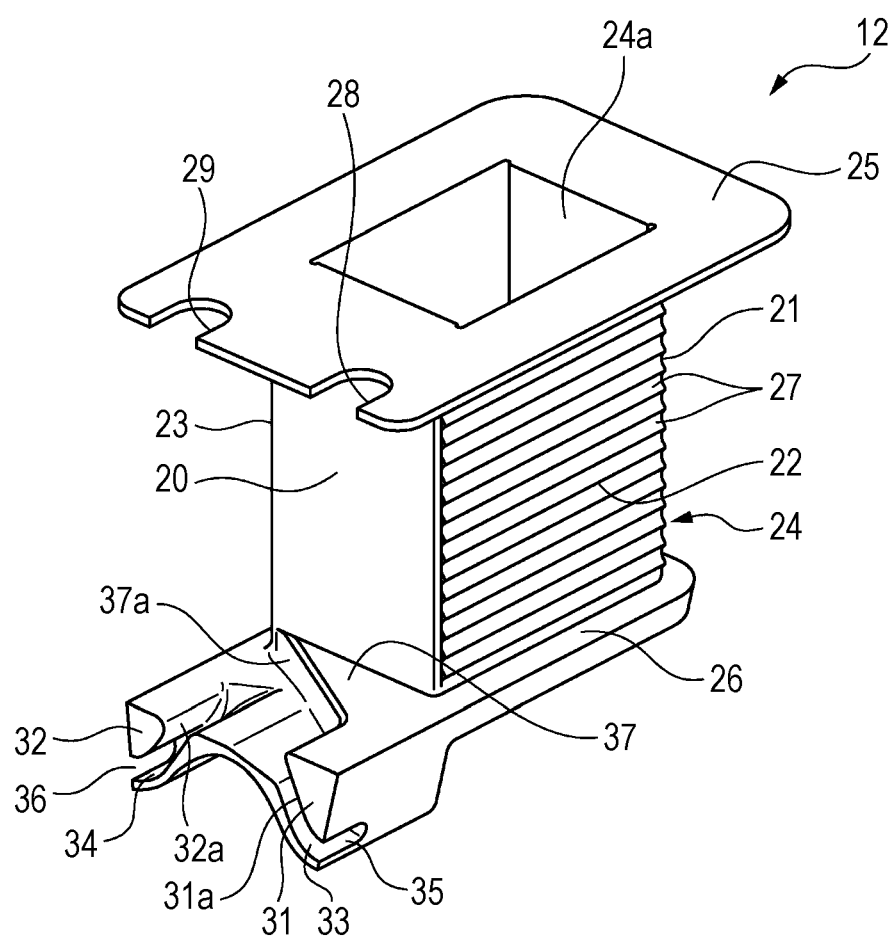

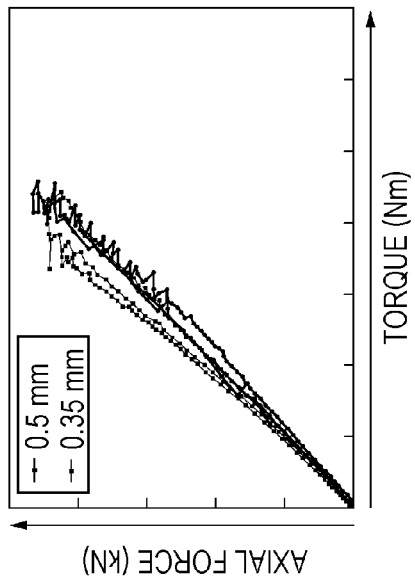
FIG. 9A1
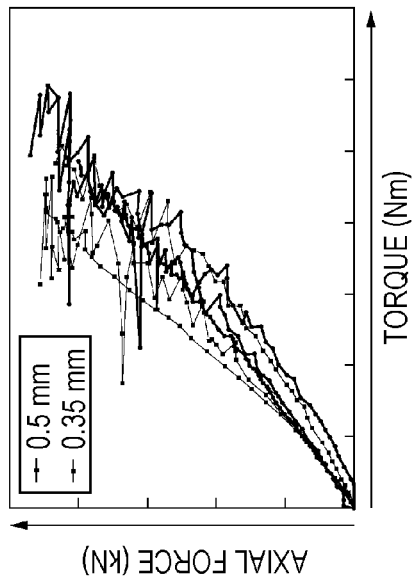
FIG. 9B1
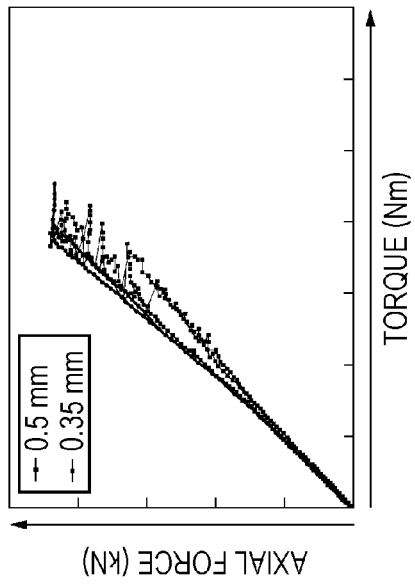
FIG. 9A2
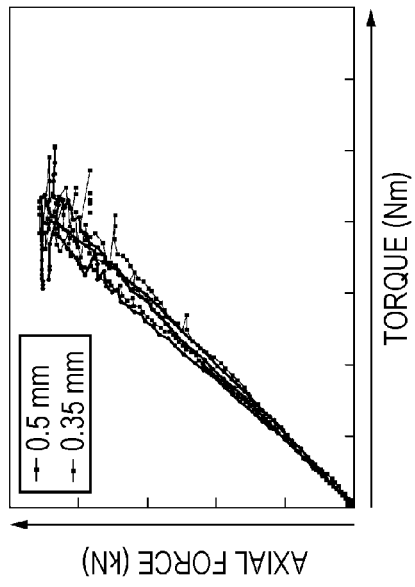
FIG. 9B2

BACKGROUND ART

OUTER ROTOR ELECTRIC MOTOR

CROSS-REFERENCES TO RELATED APPLICATIONS

The present application claims priority under 35 U.S.C. §119 to Japanese Patent Application No. 2010-245627, filed Nov. 1, 2010, entitled "Outer Rotor Electric Motor". The contents of this application are incorporated herein by reference in their entirety.

BACKGROUND OF THE INVENTION

1. Field of the Invention

The present invention relates to an outer rotor electric motor.

2. Discussion of the Background

An outer rotor electric motor that is described in Japanese Patent No. 3052573 is one example of known outer rotor electric motors. In an electric motor described in this document, as illustrated in FIG. 10, a resolver 147, which includes a resolver stator 145 and a resolver rotor 146, is disposed at a position that is offset in the axial direction from a surfaces of a stator for an electric motor 134 and a rotor for an electric motor 130 that oppose each other, and is superposed with a stator core 137 for an electric motor in a radial direction.

In the electric motor described in Japanese Patent No. 3052573, the resolver 147 is disposed so as to be superposed with the stator core 137 for an electric motor in the radial direction.

SUMMARY OF THE INVENTION

According to one aspect of the present invention, an outer rotor electric motor includes a stator, an annular rotor and a resolver. The stator includes a stator core and a plurality of coils. The stator core has a plurality of teeth that are spaced at a specified interval in a circumferential direction. The plurality of teeth protrude radially. Each of the plurality of coils is formed by winding a wire around an outer circumference of each of the plurality of teeth. The annular rotor is disposed radially outward with respect to the stator. The resolver is disposed radially inward with respect to the stator core and includes a resolver stator and a resolver rotor. The resolver stator is mounted on the stator or a case member. The resolver rotor is mounted on the annular rotor or a support member that supports the annular rotor such that the resolver rotor opposes the resolver stator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a perspective view of an insulator.

FIGS. 9A1 to 9B2 are graphs illustrating relationships between tightening torques of bolts and axial forces. FIGS. 9A1 and 9A2 are graphs respectively illustrating results of first and second measurement in which a washer is used.

FIGS. 9B1 and 9B2 are graphs respectively illustrating results of first and second measurement in which the washer is not used.

DESCRIPTION OF THE EMBODIMENTS

Figure 1:
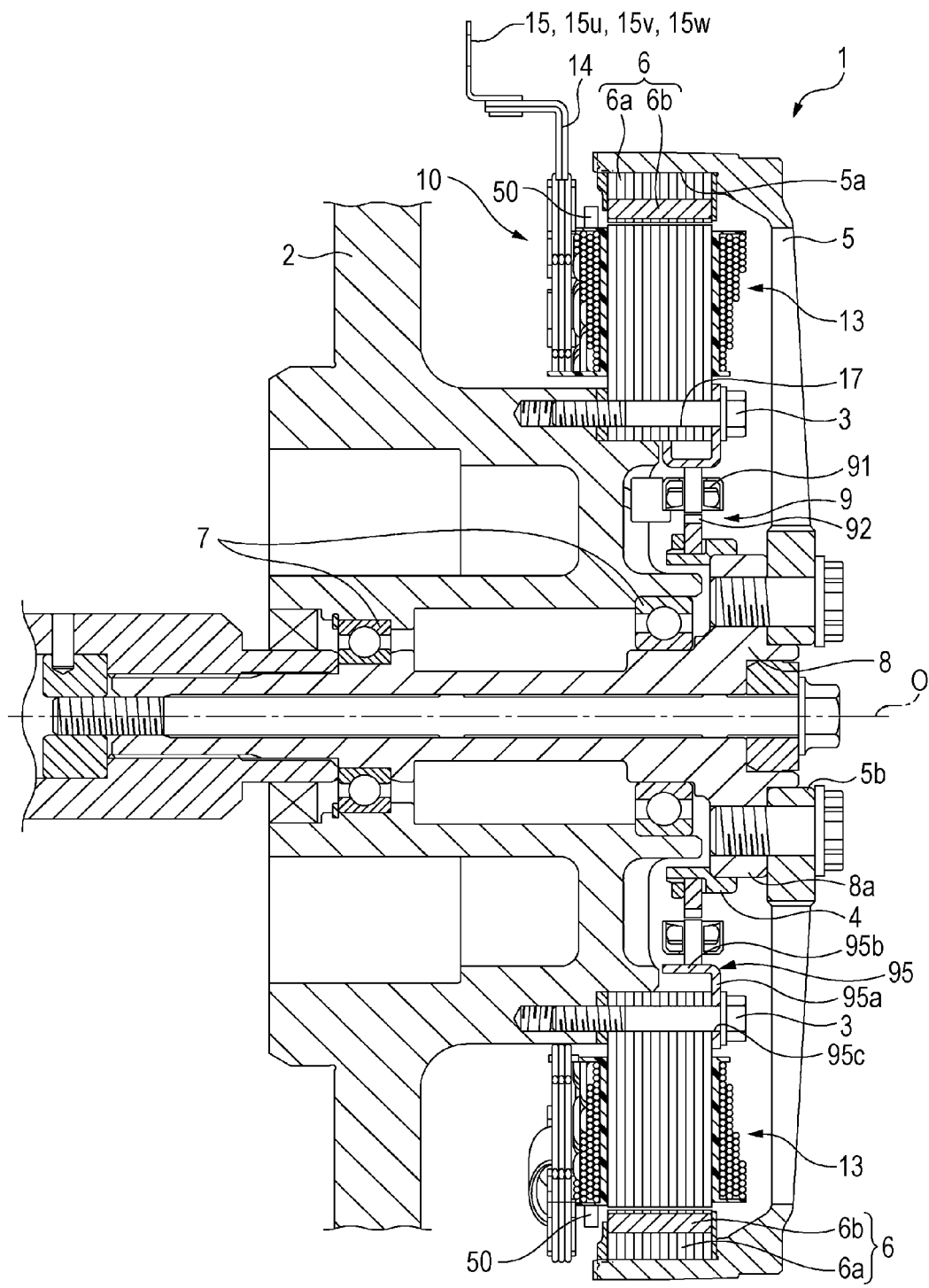
FIG. 1 is a vertical sectional view of an electric motor according to the embodiment of the present invention.

The embodiments will now be described with reference to the accompanying drawings, wherein like reference numerals designate corresponding or identical elements throughout the various drawings. The drawings are to be seen in a direction in which reference numerals are oriented.

FIG. 1 is a vertical sectional view of an electric motor according to the embodiment of the present invention. As illustrated in FIG. 1, the electric motor according to the present embodiment is a three-phase eight-pole pair outer rotor electric motor 1. The electric motor 1 includes a stator 10 and a rotor 6, both of which are centered at the axis O. The stator 10 is secured to a motor housing 2 using bolts 3. The annular-shaped rotor 6 is disposed radially outward with respect to the stator 10 with a slight clearance therebetween.

The rotor 6 having a substantially annular shape includes a rotor core 6a, which is formed of laminated magnetic steel sheets and a magnet 6b that is embedded in the rotor core 6a. The rotor 6 is secured to an inner circumference surface 5a of a flange portion of an arm member 5. The arm member 5 has a flanged disc shape. The rotor 6 is also secured to a rotating shaft 8 such that the rotor 6 is rotatable together with the rotating shaft 8 relative to the motor housing 2. The rotating shaft 8 is supported by ball bearings 7 fitted into the motor housing 2 such that the rotating shaft 8 is rotatable relative to the motor housing 2. The rotor 6 is rotated due to a rotating magnetic field generated in the stator 10. A resolver 9, which detects a magnetic pole position of the rotating shaft 8, is disposed between the rotating shaft 8 and the stator 10.

As illustrated in FIGS. 2 to 5, the stator 10 includes a stator core 11 and a plurality of (24 in the present embodiment) coils 13 (13u, 13v, and 13w). The stator core 11, which generally has a substantially annular shape, is formed of a plurality of magnetic steel sheets that are laminated in the axial direction of the stator 10, which is a direction perpendicular to a surface of the drawing sheet of FIG. 5. The stator core 11 has a plurality (24) of teeth 11b, which radially outwardly protrude from an annular portion 11a and are arranged in a circumferential direction. In the annular portion 11a of the stator core 11, a plurality of (6 in the present embodiment) protruding portions 11c are formed on an inner circumferential side. Each protruding portion 11c has a bolt hole 17 formed therein. The stator 10 is secured to the motor housing 2 using the bolts 3 that are inserted through the bolt holes 17 (see FIG. 1).

The coils 13 are each formed of a wire 14 that is wound around the corresponding tooth 11b of the stator core 11 as a concentrated winding for a salient pole. The wire 14 includes a specified number of conducting wires. In the present embodiment, the wire 14 is a bundled wire formed of bundled two conducting wires (parallel winding. The bundled two conducting wires are referred to as a bundled wire 14 hereinafter). An insulator 12, which is formed of a material having an insulating property such as synthetic resin, is disposed between each of the teeth 11b and the bundled wire 14.

The coils 13 include eight coils for each of three phases, or U, V, and W phases. That is, there are eight U-phase coils 13u, eight V-phase coils 13v, and eight W-phase coils 13w, each of which is wound around the corresponding one of the teeth 11b. The U-phase coil 13u, the V-phase coil 13v, and the W-phase coil 13w are arranged clockwise in this order. Specifically, every two of the coils 13 of a specific phase (for example, the U-phase coils 13u) are disposed with coils of the other phases (for example, a V-phase coil 13v and a W-phase coil 13w) therebetween, and are connected to each other using a connection portion 14T that bypasses the coils 13 of the other phases.

Referring to FIG. 6, the insulator 12 has a body portion 24, an outer circumference flange 25, and an inner circumference flange 26. The bundled wire 14 is wound around the body portion 24. The outer circumference flange 25 and the inner circumference flange 26 are disposed at the respective radially end portions of the body portion 24. The body portion 24, which is formed to have a rectangular tubular shape and a rectangular section, has a rectangular hole 24a that radially penetrates through the body portion 24. The rectangular hole 24a is defined by walls 20 and 21, which oppose each other in the axial direction of the stator 10, and walls 22 and 23, which oppose each other in the circumferential direction of the stator 10. The size of the rectangular hole 24a is such that the rectangular hole 24a is slightly larger than the tooth 11b of the stator core 11 so as to allow the tooth 11b to be inserted into the rectangular hole 24a. The walls 22 and 23 each have a plurality of grooves 27, each of which extends in a direction perpendicular to the axis of the rectangular hole 24a. The grooves 27 are used to position the bundled wire 14 when the bundled wire 14 is wound.

In an end portion of the outer circumference flange 25 on the wall 20 side, a pair of substantially U-shaped grooves 28 and 29 are formed. The grooves 28 and 29 are spaced apart each other in the circumferential direction. The thickness of a portion of the inner circumference flange 26 on one end side (the wall 20 side) in the axial direction gradually increases from an intermediate portion toward both end portions in the circumferential directions seen from the axial direction. At corners formed by both surfaces of the inner circumference flange 26 opposing in the circumferential direction and a radially outer surface of the inner circumference flange 26, inner winding support portions 31 and 32 are formed. The inner winding support portions 31 and 32 each have a substantially triangular pole shape and protrude toward the one end side in the axial direction. Inclined surfaces 33 and 34 are formed in a portion of the inner circumference flange 26 on the one end side in the axial direction. The inclined surfaces 33 and 34 are inclined toward a radially inward direction from the intermediate portion toward the both end portions in the circumferential directions. Inclined surfaces 31a and 32a that face the radially inward direction are formed in the inner winding support portions 31 and 32 so as to respectively oppose the inclined surfaces 33 and 34. The inclined surfaces 33 and 34, together with the inclined surfaces 31a and 32a that face the radially inward direction, define groove portions 35 and 36.

A guide portion 37, which is inclined relative to the wall 20, is formed in a border between the wall 20 and a portion of the inner circumference flange 26 on the one end side in the axial direction. The guide portion 37 guides the bundled wire 14 that is initially wound along the wall 20 toward a one end surface side (left end surface side in FIG. 6) in the circumferential direction from the other end surface side (right end surface side in FIG. 6) in the circumferential direction. The guide portion 37 has a step portion 37a that guides the bundled wire 14 in the axial direction from the groove portion 35 to the body portion 24.

Figure 2:
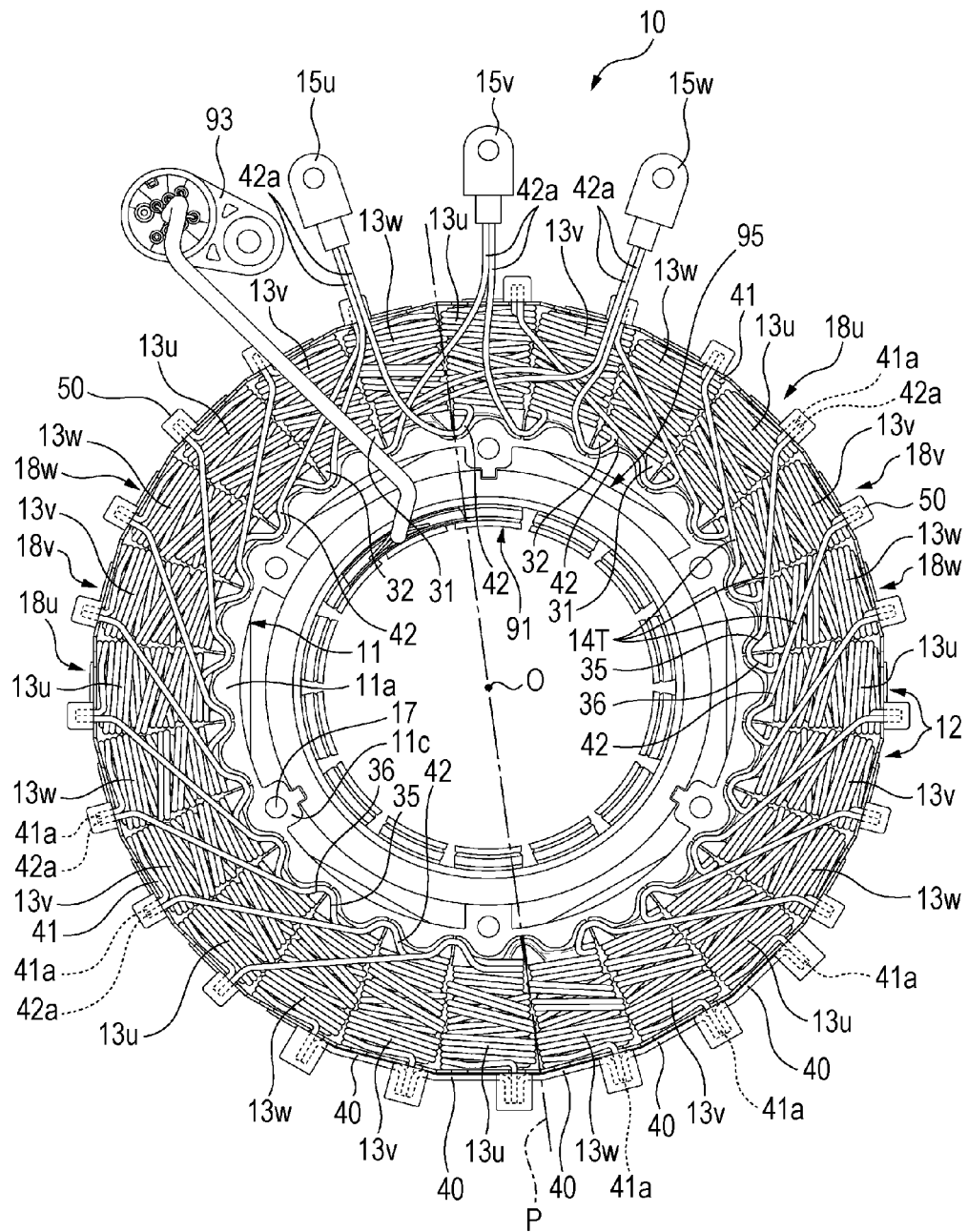
FIG. 2 is a front view of a stator illustrated in FIG. 1.
Figure 3:
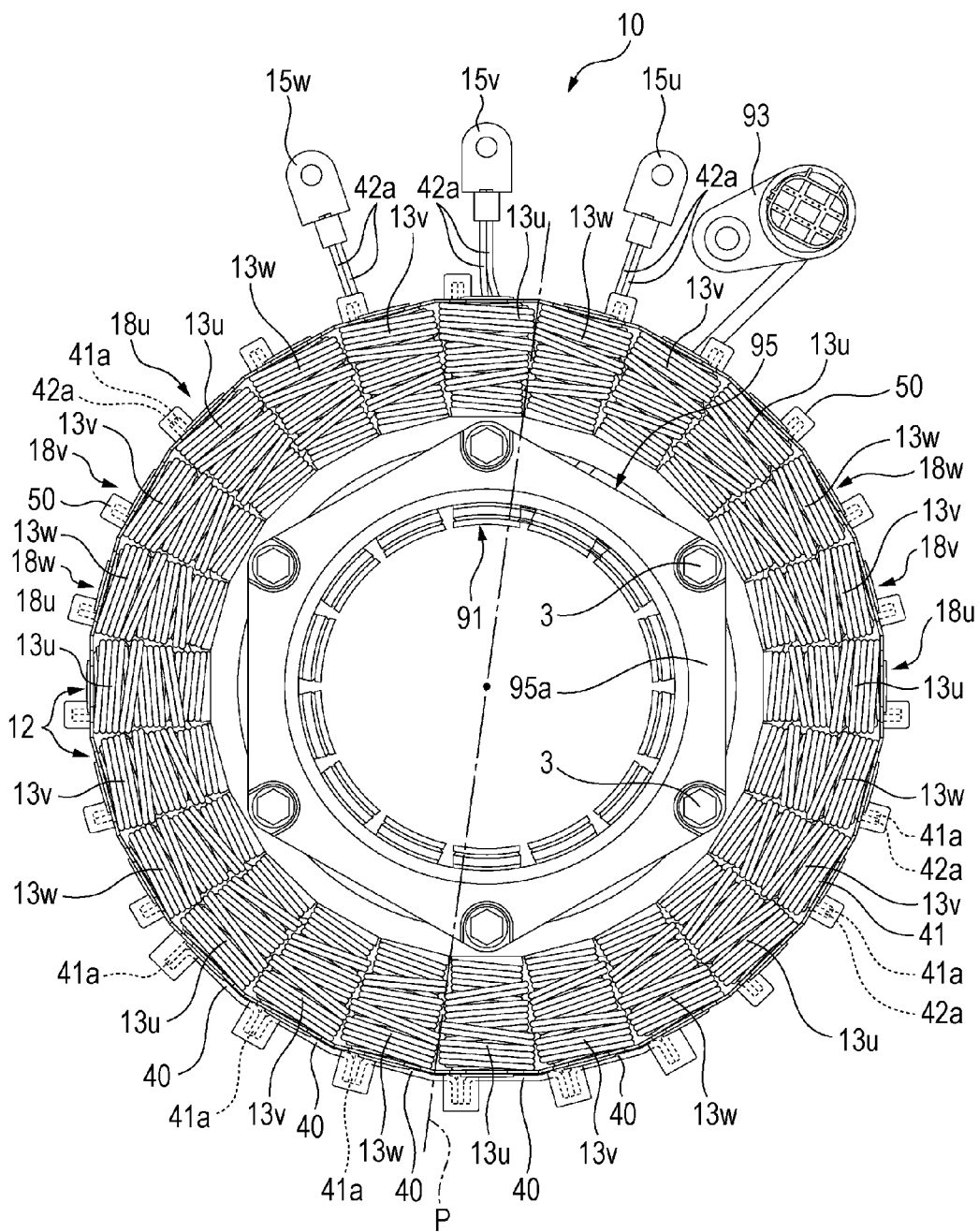
FIG. 3 is a rear view of the stator illustrated in FIG. 1.
Figure 4:
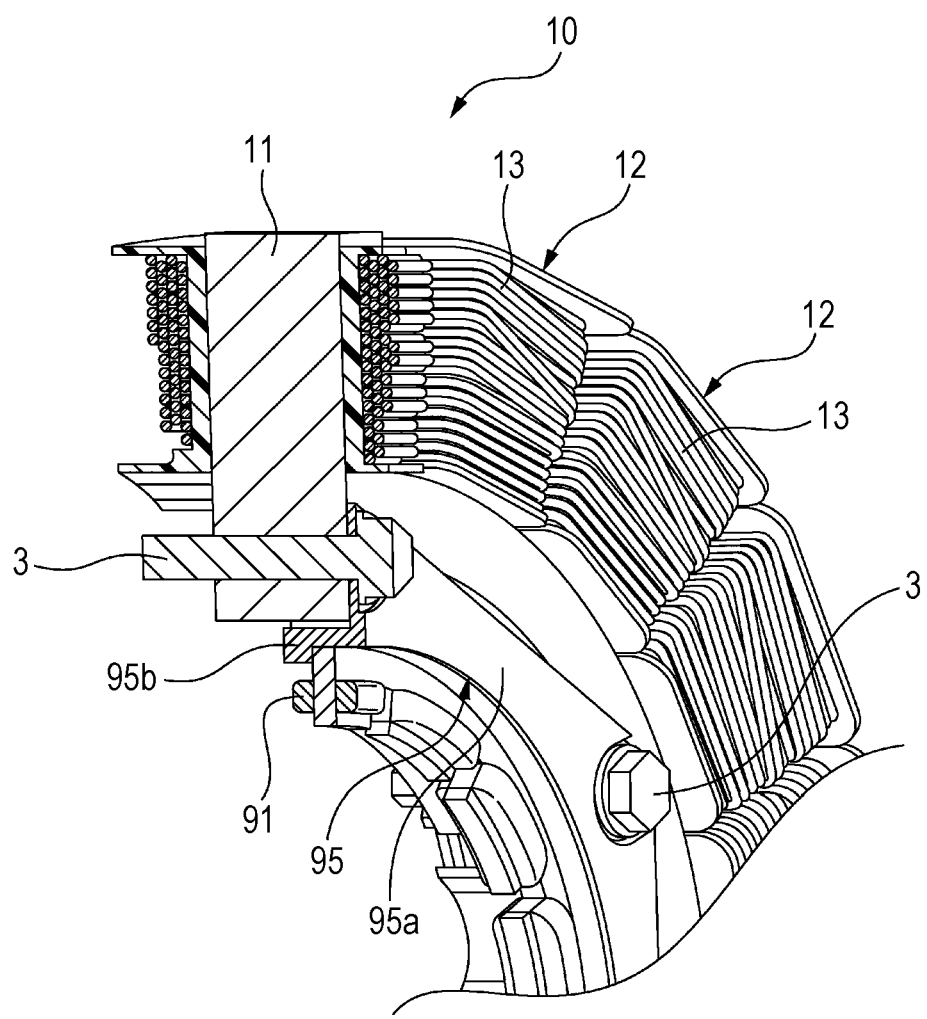
FIG. 4 is a perspective view of part of the stator illustrated in FIG. 1.
Figure 5:
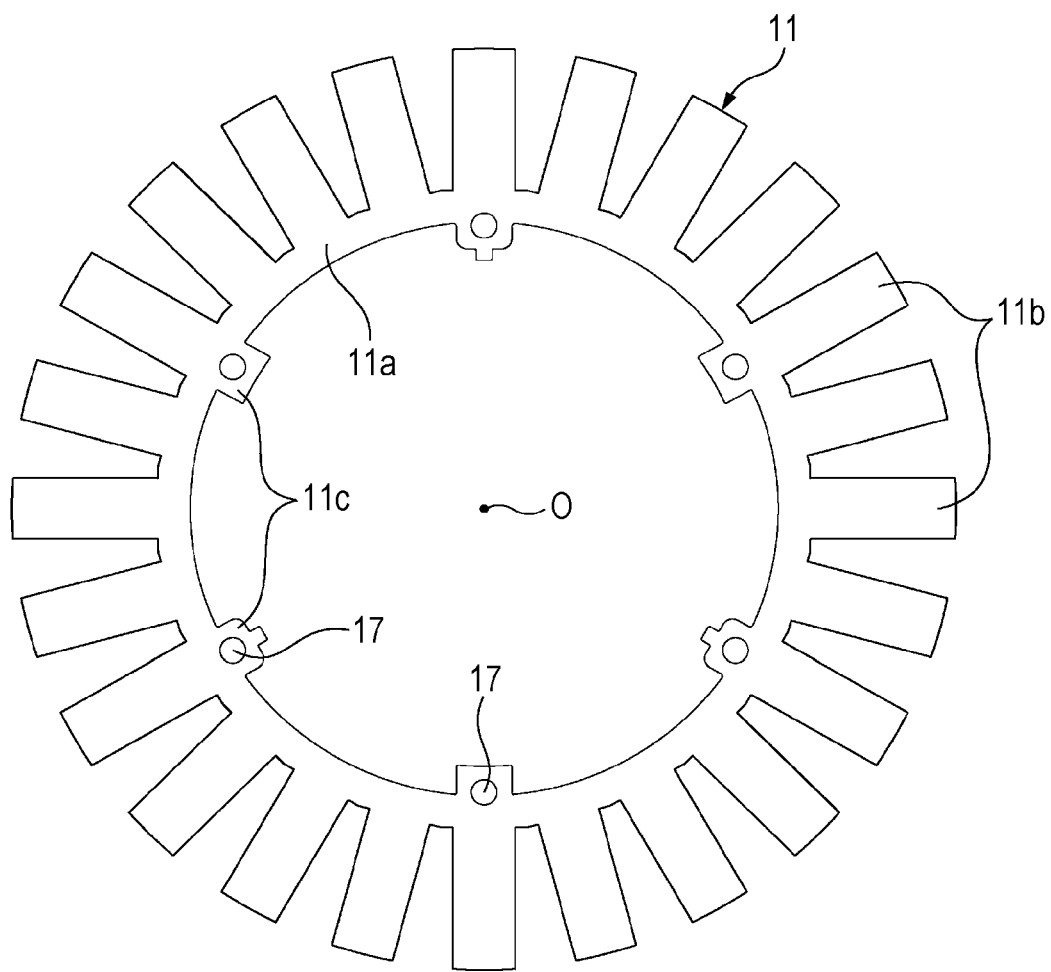
FIG. 5 is a front view of a stator core.
Figure 7A:
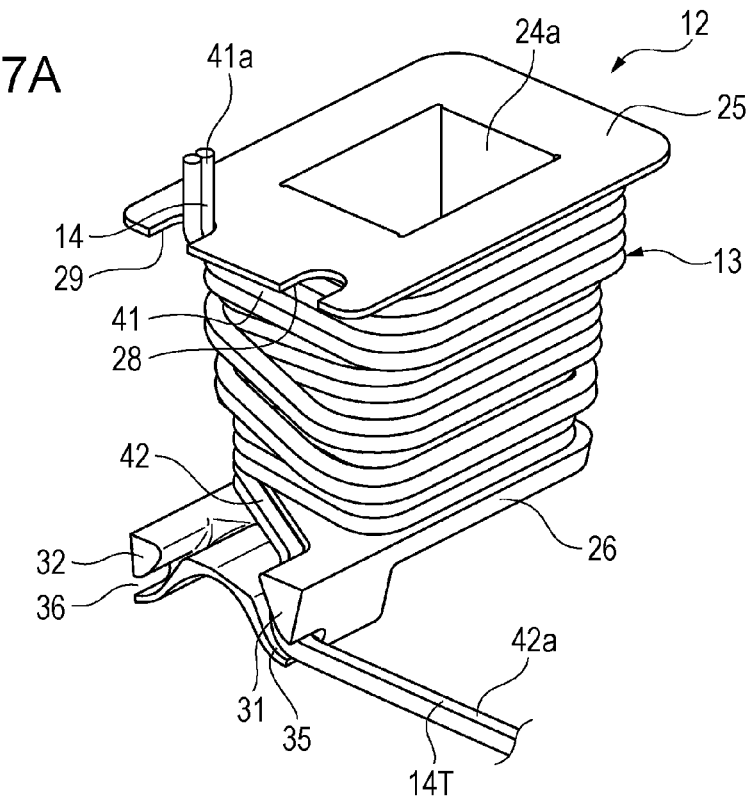
FIG. 7A is a perspective view of a first coil in which a wire is wound around the insulator.
Figure 7B:
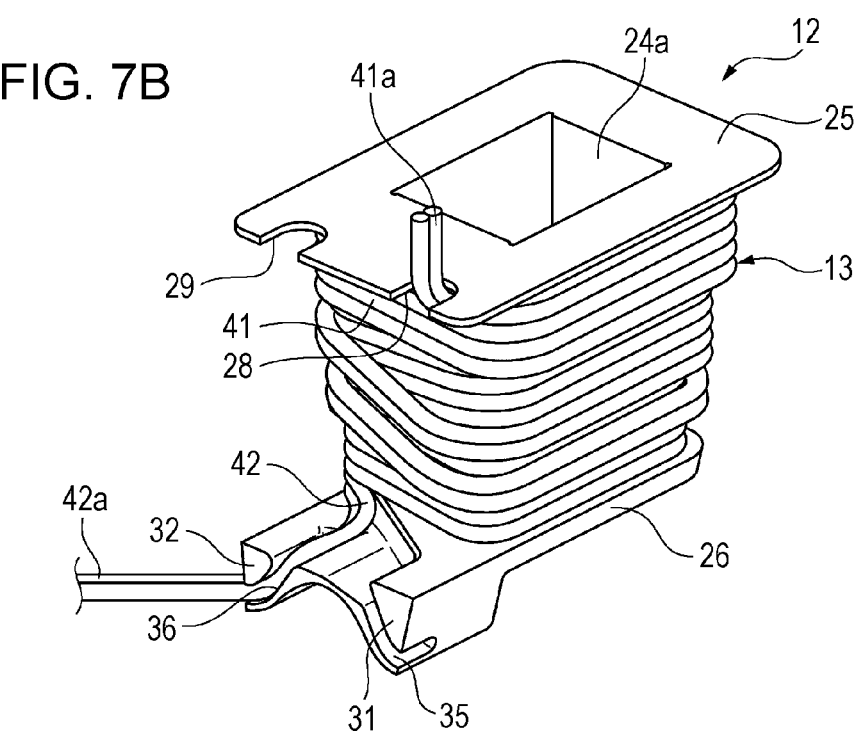
FIG. 7B is a perspective view of a second coil in which the wire is wound around the insulator.

The bundled wire 14 is wound in a plurality of turns around the body portion 24 of the insulator 12 in order to form the coil 13. In the present embodiment, the coils 13 include two types of coils that are wound around the insulators 12 in different ways. As illustrated in FIGS. 7A and 7B, a first winding end 41 of each of the coil 13, which is wound around the body portion 24 of the insulator 12, is positioned on the radially outer side of the body portion 24. A second winding end 42 extends from the radially inner side of the body portion 24 toward the radially outer side of the body portion 24 while bypassing the coils 13 of different phases. As illustrated in FIG. 7A, the first winding end 41 of the first coil 13 is inserted into the groove 29 illustrated on the left in FIG. 7A. The length of the first winding end 41 is determined such that an end portion 41a of the first winding end 41 slightly protrudes from the outer circumference flange 25 toward the radially outer side. The second winding end 42 of the first coil 13 is obliquely routed through the groove portion 35 toward the lower right direction so as to face the inclined surface 33, which faces the radially inward direction, in the axial direction. The second winding end 42 passes through the groove portion 35 and is hooked to the inner winding support portion 31. Having been hooked to the inner winding support portion 31, as illustrated in FIG. 2, the second winding end 42 extends toward the radially outer side, and an end portion 42a thereof is connected to the end portion 41a of the first winding end 41 of the same phase coil 13 that is adjacent in the circumferential direction. Thus, the length of the second winding end 42 is determined such that, in addition to the length of the connection portion 14T that bypasses the coils 13 of the different phases, the end portion 42a slightly protrudes from the outer circumference flange 25 to the radially outer side.

As illustrated in FIG. 7B, the first winding end 41 of the second coil 13 is inserted into the groove 28 illustrated on the right in FIG. 7B. The length of the first winding end 41 is determined such that the end portion 41a of the first winding end 41 slightly protrudes from the outer circumference flange 25 toward the radially outer side. The second winding end 42 of the second coil 13 is hooked to the inner winding support portion 32 and is obliquely routed through the groove portion 36 toward the lower left direction so as to face the inclined surface 34, which faces the radially inward direction, in the axial direction. Having been hooked to the inner winding support portion 32, as illustrated in FIG. 2, the second winding end 42 extends toward the radially outer side, and the end portion 42a thereof is connected to the end portion 41a of the first winding end 41 of the same phase coil 13 that is adjacent in the circumferential direction. Thus, the length of the second winding end 42 is determined such that, in addition to the length of the connection portion 14T that bypasses the coils 13 of the different phases, the end portion 42a slightly protrudes from the outer circumference flange 25 to the radially outer side.

Referring back to FIG. 2, eight of each of coils 13 of three phases (U-phase, V-phase, and W-phase coils 13u, 13v, and 13w) are divided into two coil groups 18, each of which includes four of each of the coils of three phases (18u, 18v, and 18w). The two coil groups respectively correspond to left and right semi-circumferences of the stator core 11. That is, one of the coil groups 18 is formed counterclockwise relative to the stator 10 (the coil group on the left side of a border line P in FIG. 2, and referred to as a counterclockwise coil group 18 hereafter). The other coil group 18 is formed clockwise relative to the stator 10 (the coil group on the right side of the border line P in FIG. 2, and referred to as a clockwise coil group 18 hereafter). The coils 13 of the counterclockwise coil group 18 are the first coils 13, and the coils 13 of the clockwise coil group 18 are the second coils 13.

However, in the embodiment illustrated in FIG. 2, out of the second coils 13 included in the clockwise coil group 18, the three coils 13 (13u, 13v, and 13w) that are connected to a neutral point, which will be described later, are each structured such that the first winding end 41 is inserted into the groove 29 and the end portion 41a of the first winding end 41 is directed upward in order to facilitate connection to the neutral point. These three coils are referred to as the third coils 13. Alternatively, all of the coils 13 included in the clockwise coil group 18 may be the second coils 13. In this case, connection to the neutral point is slightly different from that in the case in which the third coils 13 are used.

Referring to FIG. 2, the bundled wires 14, which extend from a pair of coils 13 of the same phase that are disposed at positions closest to the border line P across the border line P from each other, are connected to a U-phase connection terminal 15u. More specifically, the end portions 42a of the second winding ends 42 of the first U-phase coil 13u of the U-phase counterclockwise coil group 18u and the second U-phase coil 13u of the U-phase clockwise coil group 18u disposed closest to the border line P across the border line P from each other are connected to the U-phase connection terminal 15u.

Likewise, the end portions 42a of the second winding ends 42 of a pair of V-phase coils 13v disposed closest to the border line P across the border line P from each other are connected to a V-phase terminal 15v, and the end portions 42a of the second winding ends 42 of a pair of W-phase coils 13w disposed closest to the border line P across the border line P from each other are connected to a W-phase terminal 15w.

The counterclockwise coil group 18 and the clockwise coil group 18 meet at a position on a side opposite to a side where the connection terminals 15 of three phases (U-phase, V-phase, and W-phase connection terminals 15u, 15v, and 15w) are disposed. At this opposite side position, a pair of coils 13 of each phase, that is, six coils 13 in total, are disposed across the border line P from each other. In these six coils, the end portions 41a of the first winding ends 41 of the adjacent coils 13 are connected to each other using respective connection wires 40 so as to form the neutral point.

In the counterclockwise coil group 18, the second winding end 42 of each first coil 13 is inserted into and hooked to the groove portion 36 of the adjacent coil 13. The end portion 42a of this hooked second winding end 42 is connected to the end portion 41a of the first winding end 41, which extends toward the radially outer side, of the outer circumference flange 25 of the same phase coil that is adjacent in the circumferential direction.

Figure 8:
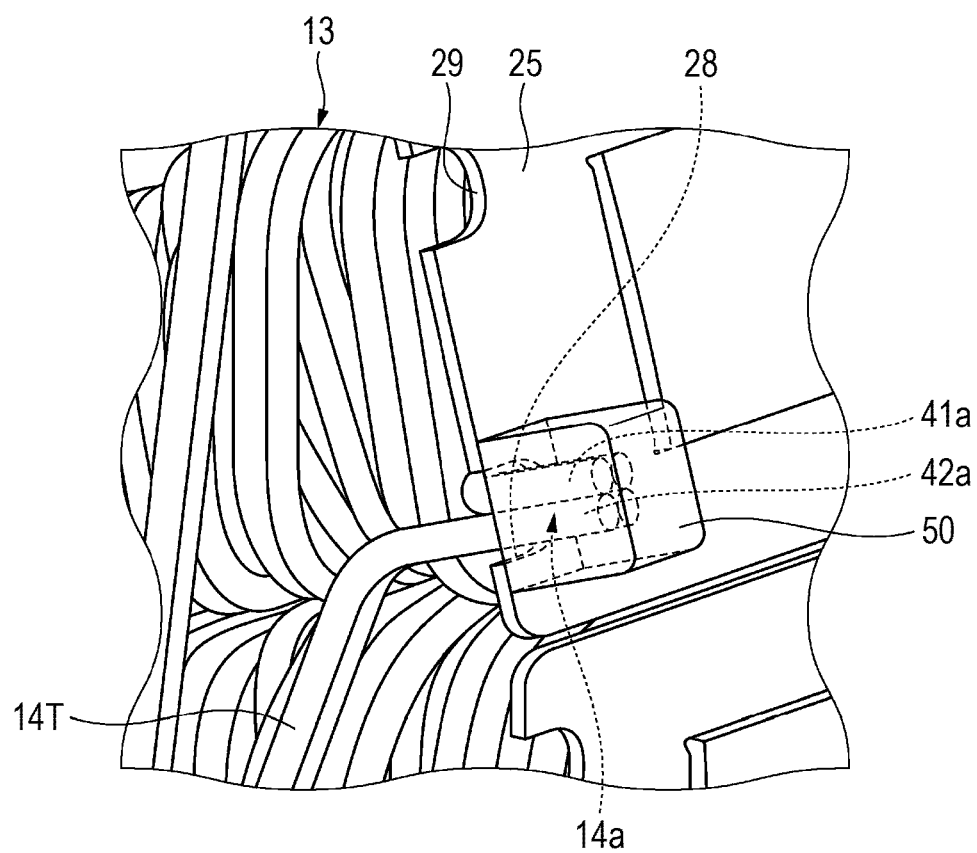
FIG. 8 is an enlarged perspective view of a connection portion by which coil windings are connected to each other.
Figure 10:
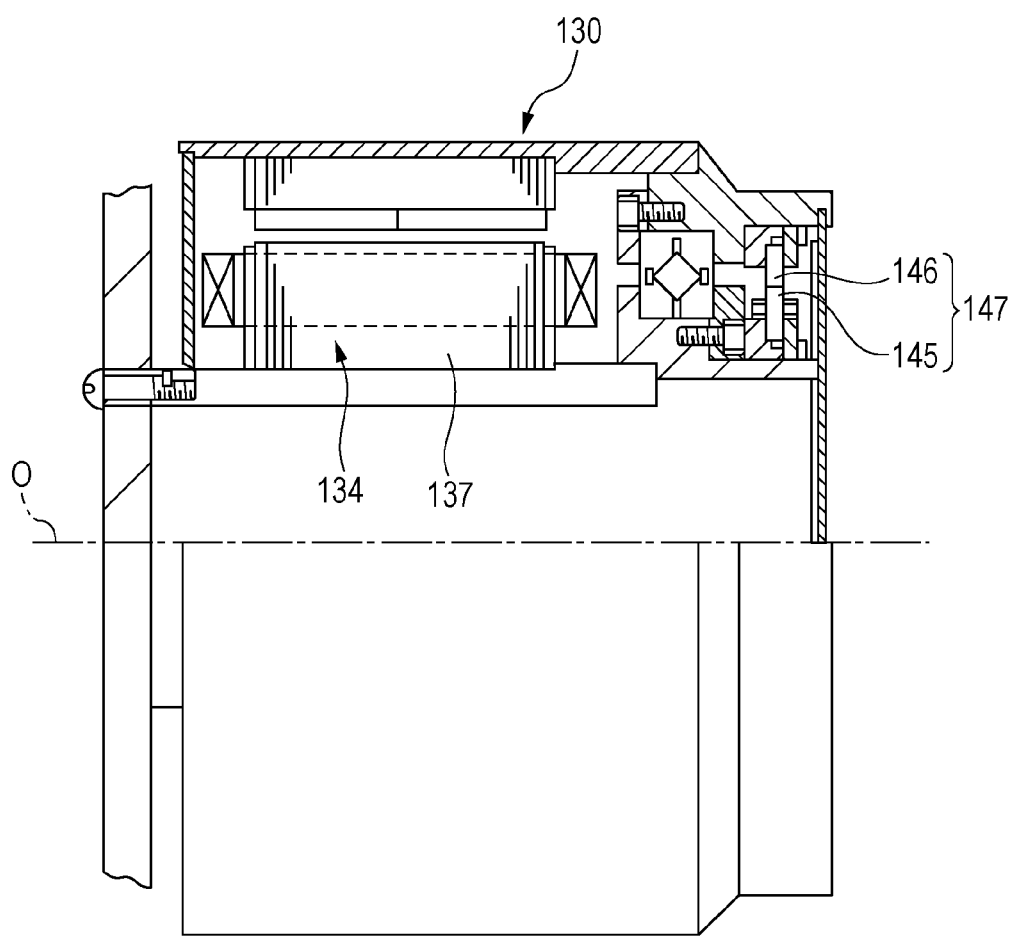
FIG. 10 is a vertical sectional view of a stator having a concentrated windings for a salient pole described in Japanese Patent No. 3052573.

Likewise, in the coils 13 of the clockwise coil group 18, the second winding end 42 of the second coil 13 is routed through the groove portion 36 of the insulator 12, and then inserted into and hooked to the groove portion 35 of the adjacent coil 13. The end portion 42a of this hooked second winding end 42 is connected to the end portion 41a of the first winding end 41, which extends toward the radially outer side, of the outer circumference flange 25 of the same phase coil that is adjacent in the circumferential direction. Referring also to FIG. 8, the end portion 41a of the first winding end 41 is connected to the end portion 42a of the second winding end 42 at a connection portion 14a, which is covered with an insulation member 50 and secured to the insulator 12. A connection process is performed by applying ultrasonic waves or a high frequency using an ultrasonic welding device (not shown), a high-frequency welding device (not shown), or the like. An insulation process is performed as follows. That is, a powder varnish as the material of the insulation member 50 is solidified so as to cover the connection portion 14a, and the covered connection portion 14a is secured to the outer circumference flange 25 of the insulator 12.

The resolver 9 of the present embodiment will be described in detail below with reference to FIGS. 1 to 4.

The resolver 9 includes a resolver stator 91 and a resolver rotor 92. The resolver stator 91 is held by a resolver stator holder 95 such that the resolver stator 91 radially inwardly protrudes from an inner circumferential surface of the stator core 11. The resolver rotor 92 is supported by a press-fit ring 4, which is press-fitted into a flange portion 8a of the rotating shaft 8 so as to axially inwardly protrude from a base end portion 5b of the arm member 5. The resolver stator 91 and the resolver rotor 92 are disposed radially inward with respect to the stator core 11 such that the resolver stator 91 and the resolver rotor 92 radially oppose each other. Surfaces of the resolver stator 91 and the resolver rotor 92 that oppose each other are positioned axially further inward than surfaces of the rotor 6 and the stator 10 of the electric motor 1 that oppose each other. That is, the resolver 9 is positioned inward with respect to the stator core 11 in the radial direction and in the axial direction. Reference numeral 93 in FIGS. 2 and 3 denotes an output terminal of the resolver 9.

The resolver stator holder 95 has integrally formed side and inner plates 95a and 95b. The side plate 95a has a substantially regular hexagonal shape seen from a rear surface (the other end side in the axial direction). The inner plate 95b extends from a lower end of the side plate 95a toward a front surface (the one end side in the axial direction) to a substantially central area in the axial direction so as to face the inner circumferential surface of the stator core 11. The resolver stator 91 is mounted on an inner circumferential surface of the inner plate 95b. A fastener hole 95c, which communicates with a corresponding one of the bolt holes 17 formed in the stator core 11, is formed at each vertex of the side plate 95a. The resolver stator holder 95 that holds the resolver stator 91 is fastened to the motor housing 2 together with the stator core 11 using a plurality of bolts 3 that are inserted through the fastener holes 95c.

The resolver 9 that is arranged as above is positioned radially inward with respect to the stator core 11. Thus, even when the rotor 6 is inclined, the amount of displacement can be small due to the short distance between the resolver 9 and the axis O. This can suppress degradation of the detection accuracy of the resolver 9. The surfaces of the resolver stator 91 and the resolver rotor 92 that oppose each other are positioned axially further inward than the surfaces of the rotor 6 and the stator 10 of the electric motor 1 that oppose each other. Thus, the length of the electric motor 1 in the axial direction can be decreased, thereby allowing the size of the motor housing 2 to be decreased.

Here, in the resolver stator holder 95 that is fastened together with the stator core 11, the side plate 95a is sandwiched between the stator core 11 and bearing surfaces of the bolts 3, and accordingly, serves as a washer.

FIGS. 9A1 to 9B2 are tightening torque-axial force graphs representing relationships between measured tightening torques of the bolts and axial forces. Measurement was performed for a case in which the washer was used and another case in which the washer was not used. For each case, measurement was performed twice (the bolts 3 were removed and tightened again between the first and the second measurement). FIGS. 9A1 and 9A2 respectively illustrate the results of the first and the second measurement in which the washer was used. FIGS. 9B1 and 9B2 respectively illustrate the results of the first and the second measurement in which the washer was not used. FIGS. 9A1 to 9B2 each include two graphs; one of the graphs represents a measurement result using silicon steel sheets (magnetic steel sheets) each having a thickness of 0.5 mm, and the other graph represents a result using silicon steel sheets (magnetic steel sheets) each having a thickness of 0.35 mm.

When FIGS. 9A1 and 9A2 are compared with FIGS. 9B1 and 9B2, axial force characteristics relative to the tightening torque in FIG. 9B1 are similar to those illustrated in FIG. 9A1 in the first measurement. In the second measurement, variation in the axial force relative to the tightening torque was larger in the measurement in which the washer was not used (FIG. 9B2) compared to that in the measurement in which the washer was used (FIG. 9A2). Thus, by using the side plate 95a of the resolver stator holder 95 as the washer, when the bolts 3 are removed and tightened again in order to replace the resolver 9 or for other purposes, the bearing surfaces on the stator core 11 side do not become rough. This allows a stable axial force to be obtained. This also prevents flaws and the like from occurring in an insulation film of the stator core 11, thereby preventing motor characteristics from being degraded.

As described above, in the electric motor 1 according to the present embodiment, the resolver 9 is disposed radially inward with respect to the stator core 11. Thus, even when, for example, a slight inclination of the rotor 6 occurs, the amount of displacement of the resolver rotor 92 is small. This can suppress degradation of detection accuracy.

Also in the electric motor 1 according to the present embodiment, the resolver stator 91 is held by the resolver stator holder 95, and the resolver stator holder 95 is fastened to the motor housing 2 together with the stator core 11 using the bolts 3. Thus, the resolver stator holder 95 serves as the washer, thereby suppressing a possibility of damage to the insulation film on a surface of the stator core 11 caused by the bearing surfaces of the bolts 3. This can suppress variation in axial force. In addition, bolts used to mount the resolver 9 and screw holes of the motor housing 2 can be omitted, thereby allowing the manufacturing cost to be decreased and the weight of the electric motor 1 to be decreased.

In the electric motor 1 according to the present embodiment, the rotor 6 is supported by the rotating shaft 8 that is concentric with the stator core 11 using the arm member 5, and the resolver rotor 92 axially inwardly protrudes from the base end portion 5b of the arm member 5 so as to oppose the resolver stator 91. Thus, the length in the axial direction can be decreased, thereby allowing the size of the electric motor 1 to be decreased.

In addition, in the electric motor 1 according to the present embodiment, the surfaces of the resolver stator 91 and the resolver rotor 92 that oppose each other are positioned axially further inward than the surfaces of the rotor 6 and the stator 10 that oppose each other. Thus, the length in the axial direction can be decreased, thereby allowing the size of the electric motor 1 to be decreased.

The present invention is not limited to the above-described embodiment. Modifications, improvement, and so forth to the embodiment are possible where appropriate. Although an outer rotor electric motor including a stator having concentrated windings for a salient pole is described above, the present invention is not limited to this. The present invention may be applicable to an outer rotor electric motor including a stator having windings of other types such as distributed windings. Alternatively, insulating paper or the like may be used instead of the insulator 12.

Alternatively, the resolver stator 91 may be directly mounted on the motor housing 2 instead of the stator core 11. Alternatively, the resolver rotor 92 may be directly mounted on the rotor 6, or, for example, the arm member 5 instead of the rotating shaft 8.

An outer rotor electric motor (for example, an electric motor 1 in the embodiment) according to of the embodiment of the present invention includes a stator for an electric motor (for example, a stator 10 in the embodiment) that includes a stator core (for example, a stator core 11 in the embodiment) having a plurality of teeth (for example, teeth 11b in an embodiment) that are spaced at a specified interval in a circumferential direction and protrude radially, and a plurality of coils (for example, coils 13 in the embodiment) that are each formed by winding a wire (for example, a bundled wire 14 in the embodiment) around an outer circumference of the respective one of the plurality of teeth. The outer rotor electric motor also includes an annular rotor for an electric motor (for example, a rotor 6 in the embodiment) that is disposed radially outward with respect to the stator for an electric motor, and a resolver (for example, a resolver 9 in the embodiment). The resolver includes a resolver stator (for example, a resolver stator 91 in the embodiment) that is mounted on the stator for an electric motor or a case member (for example, a motor housing 2 in the embodiment), and a resolver rotor (for example, a resolver rotor 92 in the embodiment) that is mounted on the rotor for an electric motor or a support member (for example, a rotating shaft 8 in the embodiment) that supports the rotor for an electric motor such that the resolver rotor opposes the resolver stator. The resolver is disposed radially inward with respect to the stator core. Thus, even when, for example, a slight inclination of the rotor for an electric motor occurs, the amount of displacement of the resolver rotor is small. This can suppress degradation of detection accuracy.

The resolver stator may be held by a resolver stator holder (for example, a resolver stator holder 95 in the embodiment), which is fastened to the case member together with the stator core using a fastening member (for example, a bolt 3 in the embodiment). Thus, the resolver stator holder serves as a washer, thereby suppressing a possibility of damage to an insulation film on a surface of the stator core caused by bearing surfaces of the fastening member. This can suppress variation in axial force. In addition, the fastening member used to mount the resolver and a screw hole of the case member can be omitted, thereby allowing the manufacturing cost to be decreased and the weight to be decreased.

The rotor for an electric motor may be supported by a rotating shaft (for example, the rotating shaft 8 in the embodiment) that is concentric with the stator core using a rotor arm (for example, an arm member 5 in the embodiment). In this case, the resolver rotor axially inwardly protrudes from a base end portion (for example, a base end portion 5b in the embodiment) of the rotor arm such that the resolver rotor opposes the resolver stator.

Surfaces of the resolver stator and the resolver rotor that oppose each other may be positioned axially further inward than surfaces of the rotor for an electric motor and the stator for an electric motor that oppose each other.

Thus, the length in the axial direction can be decreased, thereby allowing the size of the electric motor to be decreased.

Obviously, numerous modifications and variations of the present invention are possible in light of the above teachings. It is therefore to be understood that within the scope of the appended claims, the invention may be practiced otherwise than as specifically described herein

What is claimed is:

1. An outer rotor electric motor comprising:
a stator comprising:
a stator core having a plurality of teeth that are spaced at a specified interval in a circumferential direction, the plurality of teeth protruding radially; and
a plurality of coils each of which is formed by winding a wire around an outer circumference of each of the plurality of teeth;
an annular rotor disposed radially outward with respect to the stator; and
a resolver disposed radially inward with respect to the stator core and comprising:
a resolver stator that is mounted on the stator or a case member; and
a resolver rotor that is mounted on the annular rotor or a support member that supports the annular rotor such that the resolver rotor opposes the resolver stator,
wherein the resolver stator is held by a resolver stator holder, and the resolver stator holder is fastened to the case member together with the stator core using a common fastening member, and
wherein a part of the resolver stator holder and a part of the stator core are sandwiched between the fastening member and the case member.

2. The outer rotor electric motor according to claim 1,
wherein the annular rotor is supported by a rotating shaft that is concentric with the stator core using a rotor arm, and
wherein the resolver rotor axially inwardly protrudes from a base end portion of the rotor arm such that the resolver rotor opposes the resolver stator.

3. The outer rotor electric motor according to claim 1,
wherein surfaces of the resolver stator and the resolver rotor that oppose each other are positioned axially within surfaces of the annular rotor and the stator that oppose each other.

4. An outer rotor electric motor comprising:
a stator comprising:
a stator core having a plurality of teeth that are spaced at a specified interval in a circumferential direction, the plurality of teeth protruding radially; and
a plurality of coils each of which is formed by winding a wire around an outer circumference of each of the plurality of teeth;
an annular rotor disposed radially outward with respect to the stator; and
a resolver disposed radially inward with respect to the stator core and comprising:
a resolver stator that is mounted on the stator or a case member; and
a resolver rotor that is mounted on the annular rotor or a support member that supports the annular rotor such that the resolver rotor opposes the resolver stator,
wherein the resolver stator is held by a resolver stator holder, and the resolver stator holder is fastened to the case member together with the stator core using a common fastening member,
wherein the resolver stator holder has a side plate and an inner plate which are integrally formed,
wherein the side plate is fastened to the case member together with the stator core using the fastening member,
wherein the inner plate extends from an end of the side plate along an axial direction of the rotor so as to face an inner circumferential surface of the stator core, and
wherein the resolver stator is mounted on the inner plate.

5. An outer rotor electric motor comprising:
a stator comprising:
a stator core having a plurality of teeth that are spaced at a specified interval in a circumferential direction, the plurality of teeth protruding radially; and
a plurality of coils each of which is formed by winding a wire around an outer circumference of each of the plurality of teeth;
an annular rotor disposed radially outward with respect to the stator; and
a resolver disposed radially inward with respect to the stator core and comprising:
a resolver stator that is mounted on the stator or a case member; and
a resolver rotor that is mounted on the annular rotor or a support member that supports the annular rotor such that the resolver rotor opposes the resolver stator,
wherein the resolver stator is held by a resolver stator holder, and the resolver stator holder is fastened to the case member together with the stator core using a fastening member,
wherein the resolver stator holder has a side plate and an inner plate which are integrally formed,
wherein the side plate is fastened to the case member together with the stator core using the fastening member,
wherein the inner plate extends from an end of the side plate along an axial direction of the rotor so as to face an inner circumferential surface of the stator core, and
wherein the resolver stator is mounted on the inner plate.

* * * * *